United States Patent [19]
Yamakado et al.

[11] Patent Number: 6,117,500
[45] Date of Patent: Sep. 12, 2000

[54] SHADING SPACER FOR LIQUID CRYSTAL AND A LIQUID CRYSTAL DISPLAY ELEMENT

[75] Inventors: Yoshihiko Yamakado, Toyoake; Takeshi Shiraishi, Ichinomiya; Hitomi Ozeki; Masahito Sakai, both of Aichi, all of Japan

[73] Assignee: Natoco Co., Ltd., Aichi, Japan

[21] Appl. No.: 09/081,905

[22] Filed: May 20, 1998

[30] Foreign Application Priority Data

May 23, 1997 [JP] Japan .................................. 9-150148

[51] Int. Cl.[7] .......................... C09K 19/00; C09K 19/52
[52] U.S. Cl. ........................................ 428/1.1; 252/299.01
[58] Field of Search ........................ 252/299.01; 428/1.1

[56] References Cited

U.S. PATENT DOCUMENTS

| | | | |
|---|---|---|---|
| 5,153,068 | 10/1992 | Kohara et al. | 428/405 |
| 5,547,604 | 8/1996 | Coles et al. | 252/299.01 |
| 5,567,235 | 10/1996 | Carson et al. | 106/287.16 |
| 5,605,727 | 2/1997 | Bouteiller et al. | 428/1 |
| 5,610,258 | 3/1997 | Weitzel et al. | 528/25 |
| 5,738,804 | 4/1998 | Cao et al. | 252/299.01 |
| 5,747,175 | 5/1998 | Dietz et al. | 428/480 |
| 5,855,813 | 1/1999 | Coles et al. | 252/299.5 |

*Primary Examiner*—C. H. Kelly
*Attorney, Agent, or Firm*—Donald S. Dowden; Cooper & Dunham LLP

[57] ABSTRACT

A shading spacer for liquid crystal consisting of a cross-linked polymer particles containing a dyestuff which is fixed in said polymer particles by taking a dyestuff compound having a silyl group which can be hydrolyzed in said polymer particles having a silyl group which can be hydrolyzed when said polymer particles are cross-linked, is provided in the present invention. In said shading spacer, removal of dyestuff from said polymer particles is prevented.

15 Claims, No Drawings

SHADING SPACER FOR LIQUID CRYSTAL AND A LIQUID CRYSTAL DISPLAY ELEMENT

FIELD OF THE INVENTION

The present invention relates to a shading spacer for liquid crystal and a liquid crystal display element using said shading spacer.

More particularly, the present invention relates to a shading spacer for liquid crystal consisting of a cross-linked polymer particles containing a dyestuff which is fixed in said polymer particles by taking a dyestuff compound having a silyl group which can be hydrolysed in said polymer particles having a silyl group which can be hydrolysed when said polymer particles are cross-linked.

Further, the present invention relates to a liquid crystal display element using said shading spacer. Said objects may be attained by a shading spacer.

BACKGROUND OF THE INVENTION

In the liquid crystal display element, to keep a fixed thickness of the liquid crystal layer by fixing a space between a pair of base panels, a spacer consisting of inorganic or organic particles is used and the condition of light or darkness is produced by controling orientation of the liquid crystal molecule by charging the voltage or not. In the part of dark condition, for improvement of the contrast of the picture, the transmission of the light from the back light must be prevented as much as possible.

Nevertheless, the traditional spacer for liquid crystal is transparent and has no optical rotatory power and the light can pass through the spacer even in the dark condition, so the contrast of the liquid crystal panel is remarkably low.

On the other hand, the improvement of the quality of the display accompanying the improvement of the contrast is emphatically requested, in particular with the latest liquid crystal panel.

DESCRIPTION OF THE PRIOR ART

To solve the problem, some spacers dyed by dyestuff has been provided (Tokkai Hei 1-144021, Tokkai Hei 1-144429, Tokkai Hei 4-103633, Takkai Hei 4-351639, Tokkai Hei 7-224171).

Further, some spacers consisting of a dyed polymer particles made by polymerization with dyestuff has been also provided (Tokkai Hei 5-301909, Tokkai Hei 6-256408, Tokkai Hei 6-306110).

Said spacer dyed by dyestuff, after polymerization and cross-linking are completed, has some problems. For example, said spacers are not dyed enough by dyestuff and dyestuff contained in said spacer contaminates liquid crystal.

Further, in the case of said spacer made by polymerization with dyestuff, it is feared that polymerization is inhibited by dyestuff, resulting in particles having uneven particles size and/or low mechanical strength. Further, said spacer has faults in such a way that color of dyestuff changes during polymerization and dyestuff comes out from particles after polymerization.

To prevent contamination of liquid crystal by dyestuff coming from the spacer it is provided that the surface of said spacer containing dyestuff is covered with coupling agent or polymer, but contamination by dyestuff from spacer is not completely prevented.

SUMMARY OF THE INVENTION

Accordingly, an object of the present invention is to provide a spacer useful for liquid crystal display element having an excellent shading effect.

A further object of the present invention is to provide a spacer containing dyestuff which is fixed in said spacer and does not come out from said spacer.

A Still further object of the present invention is to provide a spacer having excellent mechanical strength.

A still further object of the present invention is to provide a spacer having an excellent adhesiveness and an excellent property to prevent light passing through around particles.

A still further object of the present invention is to provide a liquid crystal display element using said spacers.

Desirably a compound which can form the mutual interstitial polymer net structure (IPN forming compound) is permeated into said particles to improve mechanical strength of said spacer.

DETAILED DESCRIPTION

Desirable method to produce polymer particles used as a shading spacer for liquid crystal of the present invention is a deposition polymerization method using a vinyl monomer mixture containing a vinyl monomer having a silyl-group which can be hydrolysed.

In said deposition polymerization, polymerization is carried out in a solvent in which vinyl monomers can be dissolved but polymer of said vinyl monomers can not be dissolved to deposit polymer particles in said solvent.

In the present invention, it is necessary to prevent cross-linking during polymerization since dyestuff is permeated into polymer particles when said polymer particles are cross-linked. Accordingly, polyfenctional vinyl compound can not be used as a cross-linking agent in the present invention.

Accordingly, in the present invention, the deposition polymerization is carried out using a vinyl monomer having a silyl group which can be hydrolysed as above described and the resultant polymer particles are hydrolysed to form cross-linking of siloxane bond.

As the above vinyl monomer having a silyl group which can be hydrolyzed, for example, γ-methacryloxypropyltrimethoxysilane, γ-methacryloxypropyltriethoxysilane, γ-methacryloxypropylmethyldimethoxysilane, γ-methacryloxypropylmethyldiethoxysilane, γ-acryloxypropylmethyldimethoxysilane, γ-methacryloxypropylbis(trimethoxy)methylsilane, 11-methacryloxyundecamethylenetrimethoxysilane, vinyltriethoxysilane, 4-vinyltetramethylenetrimethoxysilane, 8-vinyloctamethylenetrimethoxysilane, 3-trimethoxysilylpropylvinylether, vinyltriacetoxysilane, p-trimethoxysilylstyrene, p-triethoxysilylstyrene, p-trimethoxysilyl-α-methylstyrene, p-triethoxysilyl-α-methylstyrene, γ-acryloxypropyltrimethoxysilane, vinyltrimethoxysilane, N-β-(N-vinylbenzylaminoethyl-γ-aminopropyl)trimethoxysilane-hydrochloride and the like may be used.

In the deposition polymerization, the vinyl monomer having a hydrolyzable silyl group and the other vinyl monomer that can be copolymerized with the vinyl monomer may be used. As the other vinyl monomer, for example, methylacrylate, methylmetacrylate (hereinafter acrylate and methacrylate are simply referred to as (meth)acrylate.), ethyl(met)acrylate, n-propyl(meth)acrylate, isopropyl(met)acrylate, n-butyl(met)acrylate, isobutyl(meth)acrylate, t-butyl(met)acrylate, 2-ethylhexyl(met)acrylate, cyclohexyl (meth)acrylate, tetrahydrofurfuryl (met)acrylate, isobornyl (met)acrylate, β-(perphlorooctyl)ethyl(met)-acrylate, 2,2,2-triphloroethylmetacrylate, 2,2,3,3-tetraphloropropylmetacrylate, 2,2,3,4,4,4-hexaphlorobutylmetacrylate, methoxypolyethyleneglycolmonometacrylate, methyvinylether, ethyvinylether, n-propylvinylether, n-butylvinylether, isobutylvinylether, styrene, a-methylstyrene, (met)acrylonitrile and the like may be used.

The present invention is not limited by the above examples. The vinyl monomer having a hydrolyzable silyl group and the other vinyl monomer may be used separately or as a mixture which contains two or more kinds of the vinyl monomers respectively.

[Dyestuff]

In the present invention dyestuff having a hydrolyzable silyl group may be used. This dyestuff having a hydrolyzable silyl group can be obtained by mutually reacting a dyestuff having an appropriate functional group and a compound having a hydrolyzable silyl group utilizing the functional group.

Examples of combination of the functional groups that can mutually react are as follows:

| Functional group A | Functional group B |
| --- | --- |
| COOH | OH |
|  | NH$_2$ |
|  | NH |
|  | epoxy group |
|  | NCO |
| OH | epoxy group |
|  | NCO |
| COONH$_2$ | epoxy group |
|  | NCO |

As the dyestuff, azo series dye, anthraquinone series dye, azine series dye, phthalocyanine series dye, triphenylmethane series dye and the like may be used.

As the compound having a hydrolyzable silyl group, 3-acryloxypropyltrimethoxysilane, aminophenyltrimethoxysilane, γ-glycidoxypropyltrimethoxysilane, 2-(3,4-epoxycyclohexyl)ethyltrimethoxysilane and the like may be used. The appropriate dyestuff for treating is the one which can be dissolved to an aqueous solvent to permeate into the cross-linkable polymer particles.

[IPN forming compound]

The IPN forming compound used in the present invention can be any kind as long as it can be permeated into the particles and can form a mutual interstitial polymer net structure in the particles by heating. As the IPN forming compound, an epoxy group containing compound that has at least two or more epoxy groups or have one or more epoxy groups and one or more hydrolyzable silyl groups, a hydrolyzable silyl group containing compound that has two or more hydrolyzable silyl groups and the like may be used.

As the epoxy group containing compound, for example, ethyleneglycoldiglycidylether, diethyleneglycoldiglycidylether, polyethyleneglycoldiglycidylether, propyleneglycoldiglycidylether, tripropyleneglycoldiglycidylether, neopentylglycoldiglycidylether, 1,6-hexanediolglycidylether, glycerindiglycidylether, trimethylolpropanetriglycidylether, triglycidyltris(2-hydroxyethyl)isocyanurate, sorbitolpolyglycidylether, sorbitanpolyglycidylether, pentaerythritolpolyglycidylether, 3-glycididoxypropyltrimethoxysilane, 3,4-epoxybutyltrimethoxysilane, 2-(3,4-epoxycyclohexyl)ethyltrimethoxysilane and the like may be used.

As the hydrolyzable silyl group containing compound, for example, tetraethoxysilane, 2-trimethoxysilylethyltrimethoxysilane, 6-trimethoxysilylhexamethylenetrimethoxysilane, p-dimethoxysilylethylbenzene, di-3-trimethoxysilylpropyl terephthalate, di-3-trimethoxysilylpropyl adipate, tri-3-methyldimethoxysilylpropyl isocyanurate and the like may be used.

[Dyed cross-linked polymer particles]

The above dyestuff is added to the slurry that contains non-cross-linked polymer particles produced by the deposition polymerization to permeate the dyestuff into the polymer particles. If needed, the slurry containing the dyestuff may be heated to an appropriate temperature and be pressurized to an appropriate pressure. The catalyst that can improve the hydrolyzation of the silyl group and make it form a siloxane bond, for example, an acid such as hydrochloric acid, sulfric acid, acetic acid, p-toluenesulfonic acid, trichloroacetic acid and the like; an alkali such as sodium hydroxide, potassium hydroxide and the like; a tin series catalyst such as di-n-butyltin maleate, di-n- butyltin laurate and the like, is added to the slurry containing polymer particles to progress cross-linking. The surplus of the dyestuff is removed by washing after cross-linking.

As above described, dyed cross-linked polymer particles that fixed the dyestuff in themselves are produced by taking the dyestuff in the polymer particles during cross-linking. If the dyestuff can be taken in the polymer particles, the dyestuff may be added to the slurry before the catalyst is added, at the same time as the catalyst is added or after the catalyst is added. Desirably the dyestuff is added to the slurry before the catalyst is added. By adding the dyestuff to the slurry before the catalyst is added, deeper dyed cross-linked polymer particles are produced.

[Improving the mechanical strength]

If needed, the IPN forming compound may be permeated into the above dyed cross-linked polymer particles which may be heated at 100–250° C. By this treatment, the mutual interstitial polymer net structure with ether bonds, siloxane bonds, or ether bonds and siloxane bonds is formed in the particles to strengthen the fixing of the dyestuff and improve the mechanical strength of the polymer particles.

If the IPN forming compound is not permeated, the mechanical strength of the dyed cross-linked polymer particles can be improved by heating at 150–250° C. .

Since thus produced dyed cross-linked polymer particles contain the dyestuff after the polymerization of the particles, the uniformity of the polymerization reaction and the particles diameter are not spoiled, and since the dyestuff is fixed to the inside of the particles by cross-linking, the surrounding pollution by stripping or falling of the dyestuff is prevented and the particles have excellent solvent-resistance. Furthermore, since the cross-linking structure in the polymer particles forms the mutual interstitial polymer net structure by permeating the IPN forming compound into the polymer particles and heating, the fixing of the dyestuff is strengthened and the polymer particles become to have excellent mechanical strength.

[Graft polymerization to the surface of the particles]

The dyed cross-linked polymer particles of the present invention may be graft-polymerized with a polymer to the surface of the particles. To cover the surface of the particles with the polymer layer by graft polymerization, after introducing a polymeric active group such as azo group, peroxy group and the like or a chain transfer group such as polymerizable vinyl group, mercapto group and the like by using a compound having the functional group that is reactable with the functional group existing on the surface of the particles, one or two kinds of polymerizable vinyl monomer that is similar to the polymerizable vinyl monomer being used to the polymer particles of the present invention are graft-polymerized to the introduced functional group (see Tokkai Hei 5-232480, Tokkai Hei 7-300586 and Tokkai Hei 7- 300587).

If the polymer is a thermoplastic polymer, the spacer that has adhesiveness to a polyimide orientation membrane is produced. If the graft polymer layer is introduced by using a polymerizable vinyl monomer having the functional group that is reactable with an imide-action residue of a polyimide orientation membrane such as an amino group or carboxylic acid group during the graft-polymerization, the spacer that has stronger adhesiveness to the polyimide orientation membrane is produced.

As the polymerizable vinyl monomer having the above functional group, (met)acryl acid, dimethylaminoethyl(met)acrylate, dimethylaminopropyl(met)acrylate, 2-hydroxyethyl(met)acrylate, 2-hydroxypropyl(met)acrylate, glycidyl(met)acrylate, β-(3,4-epoxycyclohexyl)methylmetacrylate and the like may be used.

If as the polymerizable vinyl monomer, a monomer having a long-chain alkyl group such as octyl(met)acrylate, lauryl(met)acrylate, cetyl(met) acrylate, stearyl(met)acrylate and the like are graft-polymerized to the surface of the particles, the spacer that can prevent an abnormal orientation of liquid crystal around the spacer is produced.

If the polymerizable vinyl monomer that can provide adhesiveness to the dyed cross-linked polymer particles and the polymerizable vinyl monomer that can prevent the abnormal orientation of liquid crystal around the spacer are polymerized, each property can be provided to the particles.

The functional groups that may be introduced to the surface of the particles are hydroxyl group, carboxyl group, epoxy group, hydrolyzable silyl group, silanol group, isocyanate group, amino group, amide group, sulfone group or the functional groups that produce the above functional groups by means of hydrolyzation, condensation, ring-opening and the like.

The functional group can be introduced to the surface of the particles by using the polymerizable vinyl monomer having the above functional group during the deposition polymerization.

As the polymerizable vinyl monomer having the above functional group, for example, hydroxyl group containing monomer such as 2-hydroxyethyl(met)acrylate, 2-hydroxypropyl(met)acrylate, allyl alcohol, polyethylenglycolmonometacrylate, polypropylenglycolmonometacrylate and the like, α- or β-unsaturated carboxylic acid such as (met)acryl acid, itaconic acid, maleic acid, crotonic acid, atropic acid, citraconic acid and the like, carboxyl group containing monomer such as 2-acryloyloxyethyl succinate, 2-acryloyloxyethyl phthalate, 2-acryloyloxyethyl-hexahydro phthalate, 2-metacryloyloxyethyl succinate, 2-metacryloyloxyethyl phthalate, 2-metacryloyloxyethylhexahydro phthalate and the like, epoxy group containing monomer such as glycidyl (met)acrylate, glycidyl allyl ether and the like, the above hydrolyzable silyl group containing monomer, isocyanate group containing monomer such as (met)acryloylisocyanate, (met)acrylisocyanate, m-isopropenyl-α, α-dimethylbenzylisocyanate and the like, amino group containing monomer such as dimethylaminoethyl(met) acrylate, dimethylaminopropyl(met)acrylate and the like, amide group containing monomer such as (met)acrylamide, diacetonacrylamide, N-vinylformamide, N-vinylacetoamide and the like, sulfone group containing monomer such as p-styrene sulfonate, 2-(acryloylamino)-2-methylpropane sulfonate and the like, or mercapto group containing monomer such as mercaptopropyltrietoxysilane, mercaptopropyltrimetoxysil ane and the like may be used.

The present invention will be described more specifically below with reference to working examples. It should be noted that the present invention is not limited by these working examples in any sense.

EXAMPLE 1

(Producing dyestuff solution-A to which a hydrolyzable silyl group is added)

5 g of dyestuff having an imino group in the molecule (Orient Kougyou Inc., VALIFAST BLACK 3810), 2 g of 3-isocyanatepropyltriethoxysilane and 50 g of methylethylketone were mixed in a 100 ml volume flask. The mixture was heated to 50° C. and held at this temperature for 1 hour. After that the mixture was cooled. Then 2 g of methanol was added to the mixture and they were evaporated. As a result, solution-A that contains dyestuff having a hydrolyzable silyl group was obtained.

(Producing dyed cross-linked polymer particles-C)

198 g of styrene, 57 g of γ-metacryloxypropyltrimetoxysilane, 76.5 g of polyvinylpyrrolidone, 854 g of methanol and 22 g of water were mixed in a 2000 ml volume flask having a stirrer, a cooling tube, a thermometer and a gas introducing tube. The mixture was heated to 62° C. in flowing nitrogen. After that 12 g of 4,4'-azobis(2-methylbutylonitryl) was introduced to the mixture and they were deposition-polymerized for 7 hours. As a result, slurry that contains cross-linkable polymer particles having a hydrolyzable silyl group was obtained.

50 g of the above solution-A was added to 100 g of methanol dispersion from which non-reacted polymerizable vinyl monomer existing in the slurry was removed. The mixture was heated to 60° C. . Then 11.5 g of p-toluene sufonate dissolved to 50 g of methanol was added to the mixture as a cross-linking catalyst and reacted for 3 hours. The resultant was cooled and neutralized. After that thus obtained slurry was filtered and washed to obtain dyed cross-linked polymer particles-B.

The dyed cross-linked polymer particles-B was heated at 180° C. for 16 hours to improve mechanical strength. As a result, dyed cross-linked polymer particles-C interested which has 6.7 $\mu$m of the average particles diameter was obtained.

EXAMPLE 2

(Producing dyed cross-linked polymer particles-D mutually cross-linked by IPN forming compound)

1 g of IPN forming compound (2-(3,4-epoxycyclohexyl) ethyltrimethoxysil ane) dissolved to 2 g of toluene was added to 2 g of the dyed cross-linked polymer particles-B obtained in EXAMPLE 1, and epoxy was permeated into them. The resultant epoxy containing particles-B was heated at 200° C. for 16 hours and washed. As a result, dyed cross-linked polymer particles-D having improved mechanical strength which has 7.2 $\mu$m of the average particles diameter was obtained.

EXAMPLE 3

(Producing dyed cross-linked polymer particles-F)

157 g of styrene, 157 g of p-triethoxysilylstyrene, 79 g of polyvinylpyrrolidone, 1194 g of methanol and 17 g of water were mixed in a 2000 ml volume flask having a stirrer, a cooling tube, a thermometer and a gas introducing tube. The mixture was heated to 60° C. in flowing nitrogen. After that 12 g of 2,2'-azobisisobutylonitryl was introduced to the mixture and they were deposition-polymerized for 6 hours. As a result, the slurry that contains cross-linkable polymer particles having a hydrolyzable silyl group was obtained.

60 g of the above solution-A obtained in EXAMPLE 1 was added to 200 g of methanol dispersion from which non-reacted polymerizable vinyl monomer existing in the slurry was removed. The mixture was heated to 60° C. after it was stirred at room temperature for 1 hour. Then 10 g of sodium hydroxide dissolved to 100 g of water was added to the mixture as a cross-linking catalyst and reacted for 3 hours. The resultant was cooled and neutralized. After that thus obtained slurry was filtered and washed to obtain dyed cross-linked polymer particles-E.

The dyed cross-linked polymer particles-E was heated at 180° C. for 16 hours to improve mechanical strength. As a result, dyed cross-linked polymer particles-F interested which has 5.8 µm of the average particles diameter was obtained.

EXAMPLE 4
(Producing dyed cross-linked polymer particles-G mutually cross-linked by IPN forming compound)

1 g of IPN forming compound (triglycidyltris(2-hydroxyethyl) isocyanurate) dissolved to 2 g of N,N-dimethylformamide was added to 2 g of the dyed cross-linked polymer particles-E obtained in EXAMPLE 3, and epoxy was permeated into them. The resultant epoxy containing particles were heated at 200° C. for 16 hours and washed. As a result, dyed cross-linked polymer particles-G having improved mechanical strength which has 6.0 µm of the average particles diameter was obtained.

EXAMPLE 5
(Producing dyed cross-linked polymer particles-H having a graft polymer layer)

10 g of the dyed cross-linked polymer particles-G mutually cross-linked by the epoxy group obtained in EXAMPLE 4 was dispersed to 30 g of methylethylketone, and 3 g of metacryloylisocyanate was introduced to them. The mixture was reacted at room temperature for 30 minutes and washed. As a result, dyed cross-linked polymer particles that have a polymerizable vinyl group on the surface of the particles was obtained.

1 g of the dyed cross-linked polymer particles that have a polymerizable vinyl group on the surface, 20 g of methylethylketone, 20 g of glycidylmetacrylate and 0.2 g of benzoyperoxide were mixed in a reactor. The mixture was heated to 70° C. in flowing nitrogen and reacted for 90 minutes. Then the resultant was washed by methylethylketone. As a result, dyed cross-linked polymer particles-H having a graft polymer layer consisting of glycidylmetacrylate polymer on the surface was obtained.

EXAMPLE 6
(Producing dyed cross-linked polymer particles-I which has a graft polymer layer containing a long-chain alkyl group)

The same operation as EXAMPLE 5 was performed except using 10 g of glycidylmetacrylate and 10 g of laurylmetacrylate instead of 20 g of glycidylmetacrylate in EXAMPLE 5 to obtain dyed cross-linked polymer particles-I that has a graft polymer layer containing a long-chain alkyl group on the surface.

REFERENCE EXAMPLE 100 g of the methanol dispersion obtained in EXAMPLE 1 was heated to 60° C. 11.5g of p-toluene sufonate dissolved to 50 g of methanol was added to the methanol dispersion. The mixture was reacted for 3 hours, and then the resultant was cooled and neutralized. Thus obtained slurry was filtered and washed, and heated at 180° C. for 16 hours to improve mechanical strength. As a result, cross-linked polymer particles-J which has 6.3 µm of the average particles diameter was obtained.

EXPERIMENTAL EXAMPLE

Though the dyed cross-linked polymer particles-C, D, F, G, H, I obtained in EXAMPLE 1-6 were immersed in toluene, acetone and methanol respectively, any dyestuff did not elute from the dyed cross-linked polymer particles in each solvent. Particularly in case of the dyed cross-linked polymer particles-D, G, H, I into which the IPN forming compound was permeated, since the structure in the particles forms IPN-structure, the dyestuff can be prevented from coming out and pollution of liquid crystal in the liquid crystal display element can certainly be prevented.

Then we measured physical properties (particles-strength, specific resistance, percentage of adhesiveness and state of light passing through around particles) of each cross-linked polymer particles. The way to each measuring is as follows.
(Particle-strength)

Particle-strength was measured by using the microcompression tester MCT-201 made by Shimazu Seisakujyo. The measuring conditions are shown in Table 1.

TABLE 1

| | loading speed (g/sec) | test load (g) |
|---|---|---|
| Breaking strength | 0.054 | 5 |
| 10% compression displacement | 0.090 | 3 |
| Recovery rate | 0.029 | 1→−1 |

The numerical values in Table 1 are 5-point average of the samples.
(Specific resistance)

Specific resistance was measured by using TR8611A made by Advantest. As the liquid crystal for measuring, ZLI-1565 (specific resistance 0.404×1010 Ω·cm$^2$) made by Merck was used. As samples, cross-linked polymer particles that were dispersed in the liquid crystal as 1 weight % concentration and heated at 80° C. for 7 hours were used. As measuring cells, the cells made by EHC were used.
(Percentage of adhesiveness)

Each cross-linked polymer particles were spread over an imide-base and calcined at 150° C. for 10 minutes. Then the percentage of residual particles was measured after air blowing. The blowing pressure was 1.0 kg/cm$^2$.
(State of light passing through around particles)

Each cross-linked polymer particles were spread by a spray gun over the base that had a ITO/polyimide orientation membrane on the surface and were rubbed (90×100 mm made by EHC) to have 150–180 particles/mm$^2$. They were heated at 150° C. for 30 minutes. After that sealing agent was printed around the base, and the bases were laminated together by usual means. The resultant cell was impregnated with liquid crystal (ZLI-2293(S078W) made by Merck) to make a STN liquid crystal panel. Thus obtained liquid crystal panel was applied direct voltage (DC) at 50V for 1 second. The change of the orientation abnormality (state of light passing through) around the spacers for liquid crystal before and after the applying was evaluated. The evaluation of the light passing through is shown by the criteria of 1–5 as follows:

1: non-occurred 2: partly occurred 3: ⅓ occurred around particles 4: half or more occurred around particles 5: occurred all around particles The above results of the measuring are shown in table 2.

TABLE 2

| Samples | C | D | F | G | H | I | J |
|---|---|---|---|---|---|---|---|
| Breaking strength (kgf/mm$^2$) | 88 | non-broken | 57 | 73 | 77 | 74 | 90 |
| 10% Compression strength (kgf/mm$^2$) | 1.6 | 2.7 | 3.3 | 4.5 | 4.4 | 4.1 | 1.7 |
| Percentage of adhesiveness | 0 | 0 | 0 | 0 | 92 | 80 | 0 |
| Before applying DC | 2 | 2 | 2 | 2 | 3 | 1 | 2 |
| After applying DC | 5 | 5 | 5 | 5 | 5 | 1 | 5 |
| Specific resistance ($\times 10^{-10}$ Ω · cm$^2$) | 0.414 | 0.350 | 0.299 | 0.279 | 0.284 | 0.278 | 0.382 |

As shown in the above Table 2, the dyed cross-linked polymer particles in the present invention have the same mechanical property as the reference non-dyed cross-linked polymer particles, and improvement of the mechanical property achieved by taking the IPN forming compound in the particles can be seen. The dyed cross-linked polymer particles-C, D, F, G, H, I have almost the same specific resistance as the reference non-dyed cross-linked polymer particles-J.

Furthermore, an excellent improvement of the percentage of adhesiveness can be seen in the particles-H, I which have a graft polymer layer consisting of glycidylmetacrylate polymer, and an excellent improvement of the light passing through preventing property can be seen in the particles-I which have a graft polymer layer containing a long-chain alkyl group.

EFFECT

According to the present invention, a spacer which has a shading effect by reacting polymer particles with dyestuff having silyl group which can be hydrolysed to fix said dyestuff in said polymer particles without removal and is useful for a liquid crystal display element is provided.

By using said spacer, a liquid crystal display element wherein the contrast is much improved to obtain much clearer picture compared with the traditional liquid crystal display element using non-colored spacer can be produced.

Further, by adding IPN forming compound to said cross-linked polymer particles and heating said polymer particles, a cross-linked polymer having an improved mechanical strength is obtained as the shading spacer for liquid crystal.

Still further, by forming a graft polymer layer on the surface of said polymer particles by using a proper vinyl monomer, a shading spacer for liquid crystal having an excellent adhesiveness and an excellent property to prevent light passing through around particles is obtained.

What is claimed is:

1. A shading spacer for a liquid crystal comprising a cross-linked polymer containing a dyestuff which is fixed in said polymer wherein the dyestuff has a silyl group which can be hydrolyzed and said polymer has a silyl group which can be hydrolyzed and when said polymer is cross-linked, said dyestuff is fixed in said polymer by a siloxane bond produced by a reaction between the silyl group of said dyestuff and the silyl group of said polymer.

2. A shading spacer according to claim 1, into which a compound which can form a mutual interstitial polymer net structure is permeated to improve the mechanical strength.

3. A liquid crystal display element comprising a shading spacer according to claim 1.

4. A liquid crystal display element comprising a shading spacer according to claim 2.

5. A shading spacer for a liquid crystal comprising a cross-linked polymer containing a dyestuff which is fixed in said polymer wherein the dyestuff has a silyl group which can be hydrolyzed and said polymer has a silyl group which can be hydrolyzed and when said polymer is cross-linked, said dyestuff is fixed in said polymer by a siloxane bond produced by a reaction between the silyl group of said dyestuff and the silyl group of said polymer;

wherein the surface of said polymer is covered with a graft polymer layer.

6. A shading spacer according to claim 5 wherein adhesiveness is provided by said graft polymer layer.

7. A shading spacer according to claim 5 wherein said graft polymer layer consists of a polymer containing a long-chain alkyl group.

8. A shading spacer according to claim 5 wherein property to prevent an abnormal orientation of liquid crystal around said polymer is provided by said graft polymer layer.

9. A shading spacer according to claim 6 wherein said graft polymer layer consists of a polymer containing a long-chain alkyl group.

10. A shading spacer according to claim 6 wherein property to prevent an abnormal orientation of liquid crystal around said polymer is provided by said graft polymer layer.

11. A shading spacer according to claim 7 wherein property to prevent an abnormal orientation of liquid crystal around said polymer is provided by said graft polymer layer.

12. A liquid crystal display element comprising a shading spacer according to claim 3.

13. A liquid crystal display element comprising a shading spacer according to claim 4.

14. A liquid crystal display element comprising a shading spacer according to claim 5.

15. A liquid crystal display element comprising a shading spacer according to claim 6.

* * * * *